UNITED STATES PATENT OFFICE.

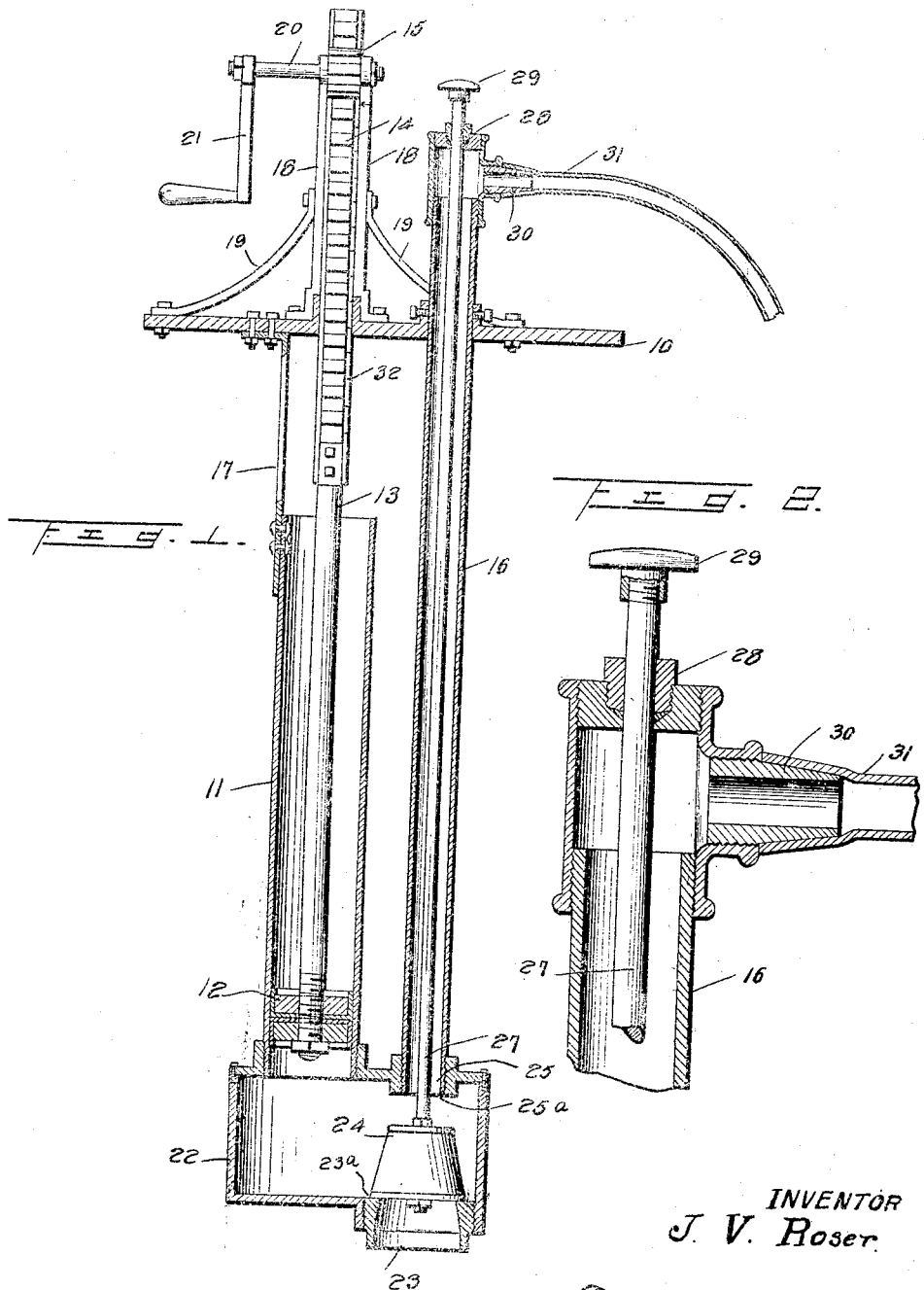

JEREMIAH V. ROSER, OF NASHVILLE, TENNESSEE, ASSIGNOR OF ONE-HALF TO CHARLES A. BRENGELMAN, OF NASHVILLE, TENNESSEE.

GREASE-PUMP.

1,383,241.   Specification of Letters Patent.   Patented June 28, 1921.

Application filed September 21, 1920. Serial No. 411,713.

*To all whom it may concern:*

Be it known that I, JEREMIAH V. ROSER, a citizen of the United States, residing at Nashville, in the county of Davidson and State of Tennessee, have invented certain new and useful Improvements in Grease-Pumps; and I do hereby declare the following to be a full, clear, and exact description of the invention, such as will enable others skilled in the art to which it appertains to make and use the same.

The object of the invention is to provide a relatively simple and efficient means for applying heavy oils and grease to machinery as for example in garages, machine shops and the like and more particularly to provide a device for this purpose which may be applied directly to the barrel or drum containing the oil or grease so that the transfer of the lubricant may be directly from the original container to the receptacle such as the oil reservoir or grease cup of the machine or vehicle to which it is to be applied, and in that connection to provide means whereby the quantity of oil or grease supplied may be graduated or measured in quantity to adapt it for use when the lubricant is being sold by measure or weight; and with these objects in view, the invention consists in a construction and combination of parts of which a preferred embodiment is shown in the drawings, wherein—

Figure 1 is a sectional view of a pump,

Fig. 2 is a detail view of the upper end of the discharge tube.

The apparatus is preferably carried by a base plate 10 and consists essentially of cylinder 11 in which operates a piston or plunger 12 actuated by a rod 13 having a rack 14 for engagement by a pinion 15, and a discharge tube 16 having valved communication with the lower end of the cylinder which is adapted to be suspended in a barrel or drum by securing the base plate over a suitable opening such as a bung hole in the wall or head of the barrel or drum, the cylinder being supported from the base plate by means of a suitable hanger 17. The guide 18 in which the rack operates rises from the base plate and may be suitably braced as shown at 19, the pinion 15 being carried by a spindle 20 to which is attached an operating crank 21.

The valve casing 22 which serves to connect the lower ends of the cylinder and discharge pipe and into suitable openings of which the lower extremities of said parts may be threaded as shown in the drawing, is provided with an inlet port 23 about which is formed a valve seat $23^a$ and the discharge port 25 about which is formed a valve seat $25^a$. The upper end of a frusto-conical valve 24 coöperates with the seat $25^a$ to close the outlet port 25, and the lower end of the valve coöperates with the seat $23^a$ to close the inlet port 23. Upon a suction stroke of the piston or plunger in the cylinder 11, the valve is seated at $25^a$ to permit of the induction of oil or grease into the valve casing and cylinder, whereas upon the discharge stroke of the piston or plunger, the valve closes the inlet port and the outlet port is open to permit of the passage of the contents of the valve casing and cylinder into and through the discharge pipe 16.

Connected with the upper end of the valve stem 27 above the stuffing box 28 in the upper end of the discharge pipe and through which said stem extends, is attached a grip or handle 29 to permit of the positive manual opening and closing of the inlet and discharge ports, so that the disadvantages attendant upon the sluggish movement or sticking of the valve may be entirely overcome and the proper operation of the pump assured.

The valve 24 being of substantially frusto-conical shape permits the use of the same with valve seats of different sizes, as for instance, the valve seat $25^a$ is much smaller than the valve seat $23^a$ so as to agree with the size of the outlet port and the inlet port and it is desirable to have the latter larger than the outlet tube or port, so that the chamber 22 will quickly fill when the inlet port is opened.

Communicating with the discharge pipe near its upper end by means of a suitable nipple 30 is a delivery tube or hose 31 which may be flexible and directed as required to discharge the lubricant into the bearing or receptacle to which it is to be applied.

Any suitable means may be provided in connection with the apparatus for measuring or determining the quantity of discharge due to the movement of the piston or plunger, when a quantitative delivery is desirable, as for example by providing the piston rod or rack forming a continuation thereof with graduations as indicated at 32.

From the foregoing description it will be noted that the pump is so constructed as to provide for manual opening and closing of the ports so as to enable the operator to control the same regardless of the stiffness or viscosity of the lubricating material which is being handled, and such positive means of adjusting or positioning the valve further provides for a more accurate measurement of the discharge from the pump, when the apparatus is to be used as a dispensing means for a marketed commodity.

Having thus described the invention, what I claim is:—

1. A pump for the purpose indicated having a cylinder and piston operating therein, means for actuating the piston, a discharge tube, and a frusto-conical valve for respectively controlling the inlet to the cylinder and the discharge through said tube, said inlet to the cylinder being of a larger diameter than the tube and closed by the large end of the valve.

2. A pump for the purpose indicated having a cylinder and a piston, means for actuating the piston, a discharge tube, a stem extending through the discharge tube and provided exteriorly thereof with a grip or handle, a valve for respectively controlling the inlet to the cylinder and the discharge through said tube, said valve being carried by said stem.

3. A pump for the purpose indicated having a cylinder and piston, means for actuating the piston, a discharge tube, a stem extending through the discharge tube and provided exteriorly thereof with a grip or handle, a frusto-conical valve for respectively controlling the inlet to the cylinder and the discharge through said tube, said valve being carried by the stem, the smaller end of the valve coöperating with the discharge port and the larger end of the valve coöperating with the inlet.

4. A pump for the purpose indicated having a cylinder and discharge tube, a piston operating in the cylinder, a common valve casing connecting the cylinder with the discharge tube, said casing having inlet and discharge ports, a valve opening inwardly with relation to the casing and respectively controlling said inlet and discharge ports, the end of the valve coöperating with the inlet port being of an area in excess of the end coöperating with the discharge port, and exposed manually operable means for reversing the positions of said valve.

5. A grease pump comprising a casing having an inlet port, a discharge tube in communication with the interior of the casing and arranged in alinement with said inlet port and of a diameter smaller than the diameter of said inlet port, and a frusto-conical shaped valve in said casing for closing the tube when in one position and for closing the inlet port when in another position.

6. A grease pump comprising a casing having an inlet port, a discharge tube in communication with the interior of the casing and arranged in alinement with said inlet port, a force pump connected to the casing, a valve in said casing for closing the tube when in one position and for closing the inlet port when in another position, and a stem connected to the valve and extending through the tube for moving the valve into either of its positions.

In testimony whereof I affix my signature in presence of two witnesses.

JEREMIAH V. ROSER.

Witnesses:
NELLIE WEISS,
ROGER KING.